(12) United States Patent
Calvert et al.

(10) Patent No.: US 11,805,160 B2
(45) Date of Patent: Oct. 31, 2023

(54) SYSTEMS AND METHODS FOR CONCURRENT CONTENT PRESENTATION

(71) Applicant: Rovi Guides, Inc., San Jose, CA (US)

(72) Inventors: Peter Jason Calvert, Limerick, PA (US); Christopher Lidaka, Apex, NC (US)

(73) Assignee: Rovi Guides, Inc., San Jose, CA (US)

( * ) Notice: Subject to any disclaimer, the term of this patent is extended or adjusted under 35 U.S.C. 154(b) by 0 days.

(21) Appl. No.: 16/826,780

(22) Filed: Mar. 23, 2020

(65) Prior Publication Data
US 2021/0297472 A1    Sep. 23, 2021

(51) Int. Cl.
*H04L 65/60* (2022.01)
*G06F 16/438* (2019.01)
*G08G 1/123* (2006.01)
*H04W 4/40* (2018.01)

(52) U.S. Cl.
CPC .......... *H04L 65/60* (2013.01); *G06F 16/4387* (2019.01); *G08G 1/123* (2013.01); *H04W 4/40* (2018.02)

(58) Field of Classification Search
CPC ...... G06F 16/64; G06F 16/438; G06F 16/635; G06F 16/4387; G08G 1/123; G08G 1/0968; G08G 1/09682; G08G 1/09683; H04L 65/60; H04L 29/06; H04W 4/00; H04W 4/06; H04W 4/40; H04W 4/46; H04W 4/48; H04W 4/60; A63G 25/00
USPC ........................................................ 709/219
See application file for complete search history.

(56) References Cited

U.S. PATENT DOCUMENTS

| | | |
|---|---|---|
| 6,366,220 B1 | 4/2002 | Elliott |
| 8,135,624 B1 | 3/2012 | Ramalingam et al. |
| 8,745,132 B2 * | 6/2014 | Obradovich ....... H04N 21/4882 709/204 |
| 8,751,293 B2 | 6/2014 | Hall et al. |
| 8,818,618 B2 | 8/2014 | Follmer et al. |
| 9,154,534 B1 * | 10/2015 | Gayles ................. H04L 65/612 |
| 9,639,907 B2 | 5/2017 | Theobald |
| 9,893,825 B1 | 2/2018 | Rao et al. |
| 9,996,861 B2 | 6/2018 | Ryan et al. |
| 10,032,212 B2 | 7/2018 | Winkelman et al. |

(Continued)

FOREIGN PATENT DOCUMENTS

| | | |
|---|---|---|
| AU | 2019203222 B2 | 6/2019 |
| WO | 2011061581 A1 | 5/2011 |
| WO | WO 2013132449 | 9/2013 |

OTHER PUBLICATIONS

U.S. Appl. No. 16/810,060, filed Mar. 5, 2020, Peter Jason Calvert.

(Continued)

*Primary Examiner* — James N Fiorillo
(74) *Attorney, Agent, or Firm* — Haley Guiliano LLP

(57) ABSTRACT

Methods and systems are employed for providing vehicle-associated concurrent content presentation over a network for in-vehicle use. The system determines a network of friends are traveling to a destination and provides an opportunity to enjoy listening to the same curated playlist of media content. The content presentation includes generating a playlist based on the user profiles or selection of the users or occupants of a vehicle and presenting the playlist to a number of vehicles occupied by network of friends.

20 Claims, 8 Drawing Sheets

(56) References Cited

U.S. PATENT DOCUMENTS

| | | | |
|---|---|---|---|
| 10,235,675 B1 | 3/2019 | Haverlah | |
| 10,248,773 B2 | 4/2019 | Wright et al. | |
| 10,306,430 B1* | 5/2019 | Abari | G05D 1/0055 |
| 10,313,714 B2 | 6/2019 | Logan | |
| 10,482,441 B1* | 11/2019 | Watson | G06Q 20/202 |
| 10,504,094 B1 | 12/2019 | Gaudin et al. | |
| 10,599,390 B1* | 3/2020 | Brahmbhatt | G06F 3/0482 |
| 10,706,487 B1* | 7/2020 | Chachra | H04W 4/40 |
| 10,803,440 B1 | 10/2020 | Gaudin et al. | |
| 10,810,572 B1 | 10/2020 | Gaudin et al. | |
| 10,846,313 B2 | 11/2020 | Finnegan et al. | |
| 10,972,206 B1 | 4/2021 | Calvert | |
| 10,992,401 B1 | 4/2021 | Calvert | |
| 10,997,570 B1 | 5/2021 | Kurani et al. | |
| 10,999,416 B1 | 5/2021 | Verma et al. | |
| 11,023,957 B1* | 6/2021 | Montague | H04W 4/023 |
| 11,074,617 B2 | 7/2021 | Patil et al. | |
| 11,107,104 B1 | 8/2021 | Brannan et al. | |
| 11,599,880 B2 | 3/2023 | Calvert | |
| 2005/0024189 A1 | 2/2005 | Weber | |
| 2006/0161599 A1* | 7/2006 | Rosen | H04L 67/306 |
| 2006/0239501 A1 | 10/2006 | Petrovic et al. | |
| 2007/0039018 A1 | 2/2007 | Saslow et al. | |
| 2008/0092168 A1 | 4/2008 | Logan et al. | |
| 2008/0156173 A1 | 7/2008 | Bauer | |
| 2009/0216433 A1* | 8/2009 | Griesmer | G01S 19/52 |
| | | | 701/532 |
| 2010/0082568 A1 | 4/2010 | Lee et al. | |
| 2010/0153008 A1 | 6/2010 | Schwartz et al. | |
| 2010/0280956 A1 | 11/2010 | Chutorash et al. | |
| 2010/0292816 A1 | 11/2010 | Anzures et al. | |
| 2011/0078024 A1 | 3/2011 | Messier et al. | |
| 2011/0093344 A1 | 4/2011 | Burke et al. | |
| 2011/0106375 A1* | 5/2011 | Gurusamy Sundaram | |
| | | | H04W 4/00 |
| | | | 701/31.4 |
| 2011/0117933 A1 | 5/2011 | Andersson | |
| 2011/0209062 A1 | 8/2011 | Faenger et al. | |
| 2011/0307350 A1 | 12/2011 | Kamimaeda et al. | |
| 2011/0314388 A1 | 12/2011 | Wheatley | |
| 2011/0320021 A1 | 12/2011 | Tahara et al. | |
| 2012/0095819 A1 | 4/2012 | Li | |
| 2012/0209657 A1 | 8/2012 | Connolly | |
| 2012/0296716 A1 | 11/2012 | Barbeau et al. | |
| 2012/0310713 A1 | 12/2012 | Mercuri et al. | |
| 2013/0085928 A1 | 4/2013 | McKinney | |
| 2013/0173419 A1 | 7/2013 | Farber et al. | |
| 2013/0185368 A1 | 7/2013 | Nordstrom et al. | |
| 2013/0191213 A1 | 7/2013 | Beck et al. | |
| 2013/0317944 A1 | 11/2013 | Huang et al. | |
| 2013/0332274 A1 | 12/2013 | Faith et al. | |
| 2014/0045530 A1 | 2/2014 | Gordon et al. | |
| 2014/0188920 A1* | 7/2014 | Sharma | G06F 16/635 |
| | | | 707/758 |
| 2014/0240089 A1* | 8/2014 | Chang | G06Q 30/0207 |
| | | | 340/5.61 |
| 2014/0281971 A1* | 9/2014 | Isbell, III | H04N 21/458 |
| | | | 715/716 |
| 2014/0310060 A1 | 10/2014 | Malsbenden et al. | |
| 2015/0058224 A1 | 2/2015 | Gaddam et al. | |
| 2015/0081157 A1* | 3/2015 | Banasky, Jr | G01C 21/3438 |
| | | | 701/532 |
| 2015/0120453 A1 | 4/2015 | Lee et al. | |
| 2015/0120509 A1 | 4/2015 | Moring et al. | |
| 2015/0127493 A1 | 5/2015 | Winkelman et al. | |
| 2015/0154571 A1 | 6/2015 | Zamer | |
| 2015/0161643 A1 | 6/2015 | Randell et al. | |
| 2015/0188967 A1 | 7/2015 | Paulauskas et al. | |
| 2015/0220992 A1 | 8/2015 | Brown et al. | |
| 2015/0234939 A1 | 8/2015 | Aharony et al. | |
| 2015/0254720 A1 | 9/2015 | Newberg et al. | |
| 2015/0269600 A1 | 9/2015 | Randle | |
| 2015/0356665 A1 | 12/2015 | Colson et al. | |
| 2015/0365725 A1 | 12/2015 | Belyaev et al. | |
| 2016/0005003 A1 | 1/2016 | Norris et al. | |
| 2016/0063511 A1 | 3/2016 | Ben-Eliezer et al. | |
| 2016/0088435 A1 | 3/2016 | Weksler et al. | |
| 2016/0098412 A1 | 4/2016 | Davidsson et al. | |
| 2016/0119661 A1 | 4/2016 | Jonnadula et al. | |
| 2016/0162936 A1 | 6/2016 | Khalil | |
| 2016/0196345 A1 | 7/2016 | Kreifeldt | |
| 2016/0197967 A1 | 7/2016 | Kreifeldt et al. | |
| 2017/0001564 A1 | 1/2017 | Bollea et al. | |
| 2017/0091764 A1 | 3/2017 | Lloyd et al. | |
| 2017/0113683 A1 | 4/2017 | Mudalige et al. | |
| 2017/0116600 A1 | 4/2017 | Sharan | |
| 2017/0166221 A1* | 6/2017 | Osterman | B60W 10/18 |
| 2017/0195166 A1* | 7/2017 | Keerthi | H04L 67/52 |
| 2017/0197617 A1* | 7/2017 | Penilla | H04W 4/029 |
| 2017/0255966 A1 | 9/2017 | Khoury | |
| 2017/0278179 A1* | 9/2017 | Perrier | G06Q 30/0621 |
| 2017/0289616 A1 | 10/2017 | Igarashi et al. | |
| 2017/0300975 A1 | 10/2017 | Iannace et al. | |
| 2018/0033045 A1* | 2/2018 | Flynn | G06Q 30/0269 |
| 2018/0033300 A1 | 2/2018 | Hansen | |
| 2018/0063684 A1 | 3/2018 | Cheng et al. | |
| 2018/0122022 A1* | 5/2018 | Kelly | G06Q 30/0633 |
| 2018/0130095 A1 | 5/2018 | Khoury | |
| 2018/0178737 A1 | 6/2018 | Studnicka | |
| 2018/0236361 A1 | 8/2018 | Ninoles et al. | |
| 2018/0240169 A1 | 8/2018 | Driscoll et al. | |
| 2018/0253805 A1 | 9/2018 | Kelly et al. | |
| 2018/0255114 A1* | 9/2018 | Dharmaji | G06F 16/435 |
| 2018/0275648 A1* | 9/2018 | Ramalingam | G01C 21/3438 |
| 2018/0276674 A1 | 9/2018 | Ramatchandirane et al. | |
| 2018/0285465 A1 | 10/2018 | Schaffernoth et al. | |
| 2018/0308081 A1 | 10/2018 | Kursun et al. | |
| 2018/0336515 A1 | 11/2018 | Mehring et al. | |
| 2018/0350144 A1 | 12/2018 | Rathod | |
| 2018/0374126 A1 | 12/2018 | Patil et al. | |
| 2019/0035284 A1* | 1/2019 | Tam | G05D 1/0293 |
| 2019/0196503 A1* | 6/2019 | Abari | G06Q 10/02 |
| 2019/0197514 A1 | 6/2019 | Tineo et al. | |
| 2019/0205951 A1 | 7/2019 | Brock | |
| 2019/0212167 A1* | 7/2019 | Yamada | G01C 21/3602 |
| 2019/0251770 A1 | 8/2019 | Gaddam et al. | |
| 2019/0306214 A1 | 10/2019 | Drapeau et al. | |
| 2019/0333378 A1 | 10/2019 | Luzifovich et al. | |
| 2019/0337512 A1 | 11/2019 | Tahmasbi-Sarvestani et al. | |
| 2019/0361463 A1* | 11/2019 | Nelson | G06F 16/9537 |
| 2019/0367062 A1* | 12/2019 | Brooks | B61L 27/12 |
| 2020/0005351 A1 | 1/2020 | Gupta et al. | |
| 2020/0020022 A1 | 1/2020 | Friedman et al. | |
| 2020/0080853 A1* | 3/2020 | Tam | G05D 1/0276 |
| 2020/0104899 A1* | 4/2020 | Banerjee | G06Q 30/0633 |
| 2020/0107064 A1* | 4/2020 | Shafai | H04N 21/41415 |
| 2020/0137464 A1* | 4/2020 | Lewis | H04N 21/8456 |
| 2020/0184437 A1* | 6/2020 | Kelly | G07F 17/0064 |
| 2020/0204966 A1* | 6/2020 | Thagadur Shivappa | |
| | | | G01S 19/51 |
| 2020/0213298 A1 | 7/2020 | Ericson | |
| 2020/0258306 A1 | 8/2020 | Forutanpour et al. | |
| 2020/0342379 A1 | 10/2020 | Phillips et al. | |
| 2020/0372488 A1 | 11/2020 | Bhasin | |
| 2020/0393259 A1* | 12/2020 | Gantt, Jr | B60L 53/65 |
| 2021/0044845 A1* | 2/2021 | Bertolami | H04N 21/4302 |
| 2021/0056555 A1 | 2/2021 | Kurylko et al. | |
| 2021/0241628 A1* | 8/2021 | Otaka | H04W 84/18 |
| 2021/0281904 A1 | 9/2021 | Calvert et al. | |
| 2021/0295387 A1 | 9/2021 | Calvert et al. | |
| 2021/0311982 A1* | 10/2021 | Kizelshteyn | G06F 16/433 |
| 2021/0357940 A1* | 11/2021 | Benkreira | G06Q 20/401 |
| 2021/0406893 A1 | 12/2021 | Calvert et al. | |
| 2021/0406894 A1 | 12/2021 | Calvert et al. | |
| 2022/0036396 A1 | 2/2022 | Calvert et al. | |
| 2022/0036397 A1 | 2/2022 | Calvert et al. | |
| 2022/0130247 A1* | 4/2022 | Liu | G07C 9/00 |
| 2022/0300921 A1 | 9/2022 | Book et al. | |
| 2022/0366397 A1 | 11/2022 | Gaudin et al. | |

(56) References Cited

OTHER PUBLICATIONS

U.S. Appl. No. 16/810,065, filed Mar. 5, 2020, Peter Jason Calvert.
U.S. Appl. No. 16/810,067, filed Mar. 5, 2020, Peter Jason Calvert.
U.S. Appl. No. 16/826,535, filed Mar. 23, 2020, Peter Jason Calvert.
U.S. Appl. No. 16/913,693, filed Jun. 26, 2020, Peter Jason Calvert.
U.S. Appl. No. 16/913,694, filed Jun. 26, 2020, Peter Jason Calvert.
U.S. Appl. No. 16/945,134, filed Jul. 31, 2020, Peter Jason Calvert.
U.S. Appl. No. 16/945,140, filed Jul. 31, 2020, Peter Jason Calvert.
Copeland et al., "Wallet-on-Wheels-Using Vehicle's Identity for Secure Mobile Money," 2013 17th International Conference on Intelligence in Next Generation Networks (ICIN) (8 pages).
U.S. Appl. No. 16/810,060, dated Mar. 5, 2020, Peter Jason Calvert.
U.S. Appl. No. 16/826,535, dated Mar. 23, 2020, Peter Jason Calvert.
U.S. Appl. No. 16/913,694, dated Jun. 26, 2020, Peter Jason Calvert.
U.S. Appl. No. 16/945,134, dated Jul. 31, 2020, Peter Jason Calvert.
U.S. Appl. No. 16/945,140, dated Jul. 31, 2020, Peter Jason Calvert.

\* cited by examiner

SYSTEMS AND METHODS FOR CONCURRENT CONTENT PRESENTATION

BACKGROUND

The present disclosure relates to systems and methods for providing vehicle-associated concurrent content presentation over a network for in-vehicle use.

SUMMARY

With the proliferation of social networking, users of such social networks, for example, as Facebook®, Snapchat®, Instagram®, Finsta®, and others, are keen to learn what playlists (e.g., songs and entertainment) are being enjoyed by friends within their social network as they drive a vehicle. In addition, we live in an evolving world, and with the impact of the COVID-19 virus, more and more social distancing is being exercised, by choice or by mandate, for many youth and adults alike. Users that were in routines of social interaction from school, work, club/sport, and religious activities are becoming isolated from friends for longer periods of time. An in-vehicle entertainment system may include, for example, streaming of a playlist over the Internet. Although the user or occupant of the vehicle may listen to the playlist, sharing the playlist with friends of the user or occupant of the vehicle within their social network for a simultaneous listening experience is limited. Likewise, seeing what your friends within your social network are listening to at any given moment is even more limiting, let alone joining your friends in listening to the same form of entertainment (e.g., a song or entertainment). A user or occupant of a vehicle traveling to an event (e.g., football game), may enjoy a playlist of songs, however, does not have a way to share that playlist with his friends traveling to the same event (e.g., football game). A user may suggest for friends to listen to a song from a particular streaming site (e.g., YouTube®, or a link to another site), however, the presentation of the playlist is not concurrent and is impossible to see what song your friend is listening at any given moment.

To overcome such limitations, methods and systems are disclosed herein for locating a plurality of vehicles, generating a playlist based on media content and transmitting the playlist for concurrent presentation over a network to the plurality of vehicles for in-vehicle use. In one embodiment, the system may determine that a first vehicle and a second vehicle are travelling to the same destination. A user or occupant of the first vehicle and user or occupant of the second vehicle are friends, and can be connected via Internet based application, a social network, (e.g., Facebook®, Snapchat®, Instagram®, Twitter®, etc.). The system can determine that the user or occupant in a first vehicle is friends (i.e., connected via Internet based application) with a user or occupant of a second vehicle and determine that the first vehicle and the second vehicle are traveling to the same destination based on user inputs.

Upon determining that the first vehicle and the second vehicle are traveling to the same location, the system generates a playlist of media content for presentation by both users or occupants of the first vehicle and the second vehicle. The playlist can include a collection of media content that is stored on the system's databases and accessed when requested. For example, the first vehicle and the second vehicle are traveling to the stadium to watch a football game and the system presents to the user or occupant of the first vehicle and the user or occupant of the second vehicle a playlist (curated list of songs directed to the football game) for concurrent presentation. In another example, the user or occupant (e.g., Maxim) of the first vehicle is listening a playlist of songs, the playlist may be provided to a user or occupant (e.g., Jeff) of the second vehicle for concurrent enjoyment and presentation of the playlist. Accordingly, the user or occupant of the first vehicle and the user or occupant of the second vehicle may listen to same playlist for combined enjoyment at the same time. In another example, both the first vehicle and the second vehicle are traveling to the same destination (e.g., Adele concert), and would like to listen to a playlist of music from Adele to prepare for the concert. The user or occupant of the first vehicle may already have a playlist of music by Adele, and can share that playlist with user or occupant of the second vehicle for combined enjoyment.

In some embodiments, a user or occupant of the first vehicle may arrive to an event (e.g., Adele concert) approximately 30 minutes prior to the concert, while a user or occupant of the second vehicle is delayed and will arrive at the event approximately 10 minutes prior to the event (e.g., Adele concert). The playlist may be transmitted to the second vehicle to coincide with the arrival at the event.

In another embodiment, a concurrent presentation of the generated playlist may be made when the first vehicle and the second vehicle are stationary. That is, the first vehicle and the second vehicle are stationary and are enjoying a football tailgate party. Both vehicles may play the playlist concurrently from the vehicles speakers to simulate a surround sound to provide for improved listening experience. In another embodiment, a concurrent presentation of the generated playlist may be made when users or occupants of a vehicle are practicing social distancing. That is, the user or occupant of a first vehicle and the user or occupant of a second vehicle may want to listen to the same song, but, because of social distancing, by choice or by mandate, are unable to listen to the playlist in one vehicle. The users of both vehicles can share a playlist or entertainment experience together while still practicing social distancing. In another example, the concurrent presentation of the generated playlist can allow people to share listening and entertainment experiences "together", even while physically apart. Based on the location of the user's vehicle and/or cell phone.

In another example, methods and systems are disclosed herein for locating a plurality of vehicles, generating a playlist and transmitting the playlist for concurrent presentation over a network to the plurality of vehicles for in-vehicle use. The system may determine that a first vehicle and a second vehicle have departed from the same location. The user of the first vehicle and the user of the second vehicle are friends, connected via Internet based application (e.g., Facebook®, Snapchat®, Instagram®, Twitter®, etc.). In other examples, the users or occupants of one or more vehicles that have a connection or relationship with one another, e.g., family members, social media connections etc. The system can determine that the user or occupant in a first vehicle is friends (i.e., connected via Internet based application) with a user or occupant of a second vehicle and determine that the first vehicle and the second vehicle are departing the same location based on the geographical location of the first vehicle and the second vehicle.

Upon determining that the first vehicle and the second vehicle are departing from the same location, the system generates a playlist of media content for presentation to both users or occupants of the first vehicle and the second vehicle. For example, the first vehicle and the second vehicle are leaving a party and want to continue to celebrate, the system presents to the user or occupant of the first vehicle and the user or occupant of the second vehicle a playlist for concurrent presentation so the party can continue as they drive away. In another example, user or occupant (e.g., Maxim) of the first vehicle is listening a playlist of songs, the playlist may be provided to a user or occupant (e.g., Jeff) of the second vehicle for concurrent enjoyment and presentation of the playlist. Accordingly, the user or occupant of the first vehicle and the user or occupant of the second vehicle may listen to the same song (e.g., "1999" by Prince) presented at the same time.

In another aspect, a Global Positioning System (GPS) can be used for tracking the location of the first vehicle and the second vehicle. The system can identify the location of the first vehicle, the second vehicle, the destination for each of the vehicles and the predicted path of both vehicles. Accordingly, the system provides an enhanced and efficient means of entertainment by allowing multiple consumers (e.g., user or occupant of first vehicle and user or occupant of second vehicle) of a playlist listen to an entire playlist for their enjoyment.

Such in-vehicle entertainment systems and methods can improve in-vehicle systems and the driving experience of the vehicle's occupants (e.g., concurrent content presentation, or identical content presentation, scheduled content presentation) without requiring any additional input from the user or occupant of the vehicle after accepting to listen to the generated playlist.

BRIEF DESCRIPTION OF THE DRAWINGS

The above and other objects, advantages and improvements of the disclosure will be apparent upon consideration of the following detailed description, taken in conjunction with the accompanying drawings, in which like reference characters refer to like parts throughout, and in which.

DETAILED DESCRIPTION

Figure 1:
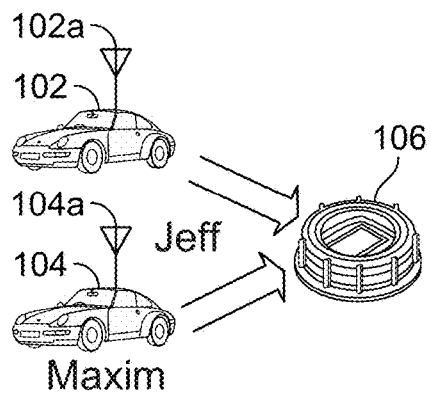
FIG. 1 shows an illustrative example for providing a generated playlist to a plurality of vehicles either travelling to the same destination or have departed from the same location, in accordance with one embodiment.
Figure 1:
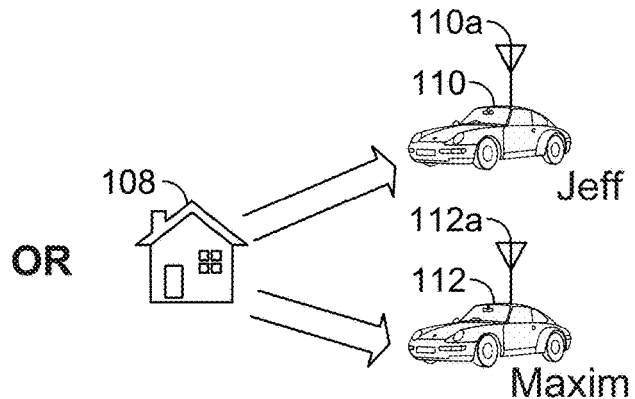
Figure 1:
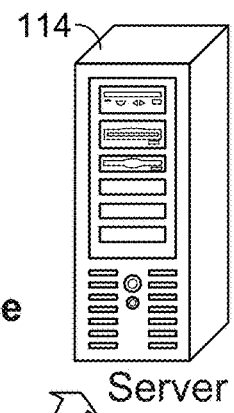
Figure 1:
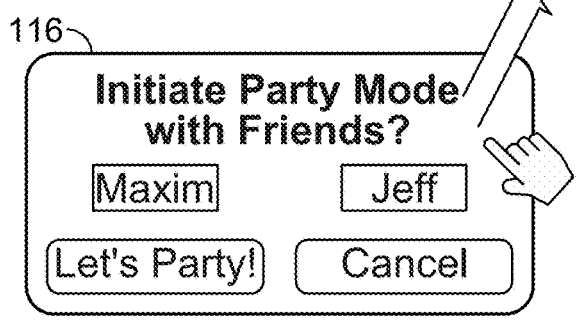
Figure 1:
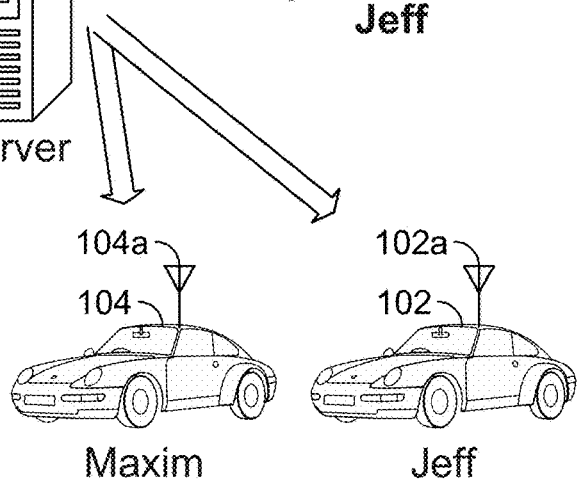

Methods and systems are disclosed herein for locating a plurality of vehicles, generating a playlist based on media content and transmitting the playlist for concurrent presentation over a network to the plurality of vehicles for in-vehicle use. In one embodiment, a method includes determining that a first vehicle and a second vehicle are either travelling to the same destination or have departed from the same location, generating a playlist of media content, and transmitting the playlist to the first vehicle and the second vehicle for concurrent presentation.

As used herein, "a vehicle content interface application" refers to a form of content that through an interface facilitates access to audio, music, news, advertisements and podcast content on one or more display devices operating within the vehicle. In some embodiments, the vehicle content interface application may be provided as an online application (e.g., provided on a website), or as a stand-alone application on a server, user device, etc. The vehicle content interface application may also communicate with a vehicle antenna array or telematics array to receive content (e.g., playlists) via a network. Various devices and platforms that may implement the vehicle content interface application are described in more detail below. In some embodiments, the vehicle content interface application and/or any instructions for performing any of the embodiments discussed herein may be encoded on computer-readable media and perform the methods disclosed herein. Computer-readable media includes any media capable of storing instructions and/or data. The computer-readable media may be transitory, including, but not limited to, propagating electrical or electromagnetic signals, or may be non-transitory including, but not limited to, volatile and nonvolatile computer memory or storage devices such as a hard disk, USB drive, DVD, CD, media card, register memory, processor caches, Random Access Memory ("RAM"), etc.

As referred to herein, the terms "media asset" and "media content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, broadcast content items, content information, pictures, rotating images, documents, playlists, websites, articles, books, electronic books, blogs, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

FIG. 1 shows an illustrative example for locating a plurality of vehicles, generating a playlist based on media content, and transmitting the playlist for concurrent presentation over a network to the plurality of vehicles for in-vehicle use. In one embodiment, as shown in FIG. 1, a system 100 determines that a first vehicle 102 and a second vehicle 104 are traveling to the same destination. In another embodiment, as shown in FIG. 1, a system 100 determines that a first vehicle 110 and a second vehicle 112 are traveling from the same destination. Each vehicle (102, 104, 110 and 112) includes, for example, a vehicle antennas 102a, 104a, 110a and 112a and a vehicle interface 116 with a hand cursor. The hand cursor can be a cursor, pointer, avatar for the vehicle interface which can be touch or voice controlled. The vehicle antennas 102a, 104a, 110a and 112a can receive and transmit signals based on the geographical location of the vehicle. The vehicle antenna 102a, 104a, 110a and 112a are receivers and transmitters, and function as a way to receive or transmit signals. In one embodiment, the vehicle antenna 102a, 104a, 110a and 112a may communicate over a wireless network that includes a wireless network that operates according to a 5G specification or standard. In another embodiment, wireless network includes a wireless network that operates according to a specification or a standard other than a 5G specification or standard. For example, wireless network may operate as a 3G network, a 4G network, an LTE network, an LTE-Advanced (LTE-A) network, a Global System for Mobile Communications (GSM) network, a Code Division Multiple Access (CDMA) network, a Wideband Code Division Multiple Access (WCDMA) network, an Ultra Mobile Broadband (UMB) network, a High-Speed Packet Access (HSPA) network, an Evolution Data Optimized (EV-DO) network, a Universal Mobile Telecommunications System (UMTS) network, or some other type of wireless network (e.g., an ad hoc network, a non-land-based wireless network, etc.). According to an exemplary implementation, wireless network includes a radio access network (RAN) and a core network. Database (not shown) can store all received or transmitted playlists generated for concurrent presentation including for example, broadcasted content items from the broadcast content sources. Database can include a server 114 or a collection of servers designed to receive and store playlists generated for concurrent presentation. The playlists can include over-the-air digital signals or over-the-air analog signals. The system may be provided for converting over-the-air, analog, or digital signals to MPEG signals for storage).

Vehicle 102, 104, 110 and 112 can perform a selection via user interface 116 to join a listening party for combined enjoyment. A playlist 112 is generated based on the selection and the received broadcast sources. The playlist is transmitted for presentation in the vehicle via vehicle antennas 102a, 104a, 110a and 112a. In another embodiment, as shown in FIG. 1, the system determines that a first vehicle and a second vehicle are departing the same destination, and generates a unique playlist for the first vehicle and the second vehicle. The playlist may include for example, multiple broadcast streams, and separating the streams into segments based on a variety of content types (e.g., music broadcast, news broadcast, traffic broadcast, etc.) and selectively providing the segments over a network for in-vehicle use to enhance and improve the listening experience for both the first vehicle and the second vehicle. Each vehicle (102, 104, 110 and 112) includes, for example, a vehicle antennas 102a, 104a, 110a and 112a and a vehicle interface 116. The vehicle antennas 102a, 104a, 110a and 112a can receive signal and can transmit signals based on the geographical location of the vehicle. The vehicle antenna 102a, 104a, 110a and 112a are receivers and transmitters, and function as a way to receive or transmit signals.

The system further includes vehicles 102, 104, 110 and 112 with vehicle antennas 102a, 104a, 110a and 112a and a vehicle interface 116. In one embodiment, the vehicle is an autonomous vehicle, a vehicle that is capable of sensing its environment and moving safely with little or no human input. The vehicle can be an Internet-connected vehicle, a vehicle that can communicate bidirectionally with other systems outside of the vehicle. The vehicle can communicate bidirectionally via the vehicle antennas 102a, 104a, 110a and 112a with the database/servers 114 to facilitate generating the playlist based on the selections and the received broadcast content items. The user interface 502 may also display audio user interface element party mode 602 among other user interface elements, which are discussed below with reference to FIG. 6. In the display 502 in the vehicle 500 may also display audio user interface element 601 among other user interface elements, which are discussed below with reference to FIG. 6. In one example, when a user or occupant of a vehicle selects on a display 502 the audio user interface element 601, the vehicle content interface application may display the user interface 600 with options for selection. For example, the user interface 600 may provide an entertainment system including prompts 602 to initiate a party mode by sharing a playlist and inviting friends to listen to the playlist. In other examples, groups of friends can be replaced with any number of users or occupants of one or more vehicles that have a connection or relationship with one another, e.g., family members, social media connections etc. Upon initiating the party mode, the vehicle antenna 110 may transmit a signal to server to share the playlist being presented in the first vehicle.

In some embodiments, a selection for media content includes, for example, a selection of content type and geographical origin in the user interface. The selection may include a first combination of content type and geographical origin. The system generates the playlist 112 based on the selection and the received broadcast content items stored in database. For example, based on the selection, the system searches for metadata of a first broadcast segment that matches the first combination of content type 110a and geographical origin 110d (e.g., Music and Memphis). The system further searches for metadata of a second broadcast segment that matches the second combination of content type 110b and geographical origin 110e (e.g., News and Denver). The playlist of the first broadcast segment 112a and the second broadcast segment 112b is buffered for presentation in the vehicle.

Figure 2:
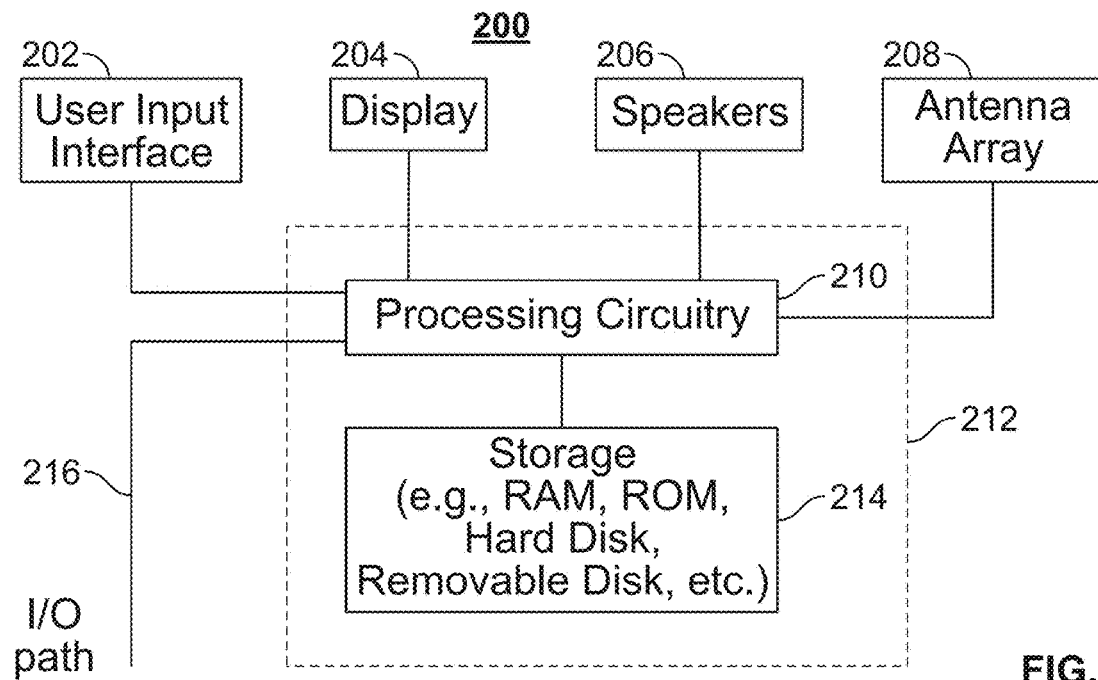
FIG. 2 depicts a block diagram of an illustrative example of a user equipment device, in accordance with one embodiment.

A user or occupant in a vehicle may access content and the vehicle content interface application (and its display screens described above and below) from one or more of their user equipment devices. FIG. 2 shows a generalized embodiment of illustrative user equipment device 200. More specific implementations of user equipment devices are discussed above in connection with FIG. 3. User equipment device 200 may receive content and data via input/output (hereinafter "I/O") path 216. I/O path 216 may provide playlists over a local area network (LAN) or wide area network (WAN), and data to control circuitry 212, which includes processing circuitry 210 and storage 214. Control circuitry 212 may be used to send and receive commands, requests, and other suitable data using I/O path 216.

Control circuitry 212 may be based on any suitable processing circuitry such as processing circuitry 210. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units. In some embodiments, control circuitry 212 executes instructions for a vehicle content interface application stored in memory (i.e., storage 214). Specifically, control circuitry 212 may be instructed by the vehicle content interface application to perform the functions discussed above and below. For example, the vehicle content interface application may provide instructions to control circuitry 212 to generate the audio content display. In some implementations, any action performed by control circuitry 212 may be based on instructions received from the vehicle content interface application.

In client-server-based embodiments, control circuitry 212 may include communications circuitry suitable for communicating with other networks or servers. The instructions for carrying out the above-mentioned functionality may be stored on the system server. Communications circuitry may include a cable modem, an integrated-services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which are described in more detail in connection with FIG. 3). In some embodiments, an antenna array 208 is provided in the user equipment device 200. The antenna array 208 may be used for communication with the network of antennas. In addition, communications circuitry may include circuitry that enables peer-to-peer communication of user equipment devices, or communication of user equipment devices in locations remote from each other (described in more detail below).

Memory may be an electronic storage device provided as storage 214 that is part of control circuitry 212. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 214 may be used to store various types of content described herein as well as content data and content application data that are described above. Nonvolatile memory may also be used (e.g., to launch a boot-up routine and other instructions). Cloud-based storage may be used to supplement storage 214 or instead of storage 214.

Control circuitry 212 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 212 may also include scaler circuitry for upconverting and down-converting content into the preferred output format of the user equipment device 200. Control circuitry 212 may also include digital-to-analog converter circuitry and analog-to-digital converter circuitry for converting between digital and analog signals. The tuning and encoding circuitry may be used by the user equipment device to receive and to display, to play, or to record content. In some embodiments, the control circuitry may include an HD antenna.

In one embodiment, speakers 206 may be provided as integrated with other elements of user equipment device 200 or may be stand-alone units. The audio and other content including generated playlists displayed on display 204 may be played through speakers 206. In some embodiments, the audio may be distributed to a receiver (not shown), which processes and outputs the audio via speakers 206.

In some embodiments, a sensor (not shown) is provided in the user equipment device 200. The sensor may be used to monitor, identify, and determine vehicular data. For example, the vehicle content interface application may receive vehicular speed data from the sensor or any other vehicular status data (e.g., global positioning data of the vehicle, driving condition of the vehicle, etc.) received from any other vehicular circuitry and/or component that describes the status of the vehicle.

The vehicle content interface application may be implemented using any suitable architecture. For example, it may be a stand-alone application wholly implemented on user equipment device 200. In such an approach, instructions of the application are stored locally (e.g., in storage 214), and data for use by the application is downloaded on a periodic basis (e.g., from an out-of-band feed, from an Internet resource, or using another suitable approach). Control circuitry 212 may retrieve instructions for the application from storage 214 and process the instructions to generate any of the displays and methods discussed herein. Based on the processed instructions, control circuitry 212 may determine what action to perform when input is received from input interface 202. For example, movement of a cursor on an audio user interface element may be indicated by the processed instructions when input interface 202 indicates that a user interface 600 was selected.

In some embodiments, the vehicle content interface application is a client/server-based application. Data for use by a thick or thin client implemented on user equipment device 200 is retrieved on demand by issuing requests to a server remote to the user equipment device 200. In one example of a client/server-based content application, control circuitry 212 runs a web browser that interprets web pages provided by a remote server. For example, the remote server may store the instructions for the application in a storage device. The remote server may process the stored instructions using circuitry (e.g., control circuitry 212) and generate the displays discussed above and below. The client device may receive the displays generated by the remote server and may display the content of the displays locally on user equipment device 200. This way, the processing of the instructions is performed remotely by the server while the resulting displays are provided locally on user equipment device 200. User equipment device 200 may receive inputs from the user or occupant of the vehicle via input interface 202 and transmit those inputs to the remote server for processing and generating the corresponding displays. For example, user equipment device 200 may transmit, via antenna array 208, a communication to the remote server indicating that a user interface element was selected via input interface 202. The remote server may process instructions in accordance with that input and generate a display of content identifiers associated with the selected user interface element as described in greater detail with reference to FIG. 6. The generated display is then transmitted to user equipment device 200 for presentation to the user or occupant of the vehicle.

In some embodiments, the vehicle content interface application is downloaded and interpreted or otherwise run by an interpreter or virtual machine (run by control circuitry 212). In some embodiments, the vehicle content interface application may be encoded in the ETV Binary Interchange Format (EBIF), received by control circuitry 212 as part of a suitable feed, and interpreted by a user agent running on control circuitry 212. For example, the vehicle content interface application may be an EBIF application. In some embodiments, the vehicle content interface application may be defined by a series of JAVA-based files that are received and run by a local virtual machine or other suitable middleware executed by control circuitry 212. In some embodiments (e.g., those employing MPEG-2 or other digital media encoding schemes), the vehicle content interface application may be, for example, encoded and transmitted in an MPEG-2 object carousel with the MPEG audio of a program.

Figure 3:
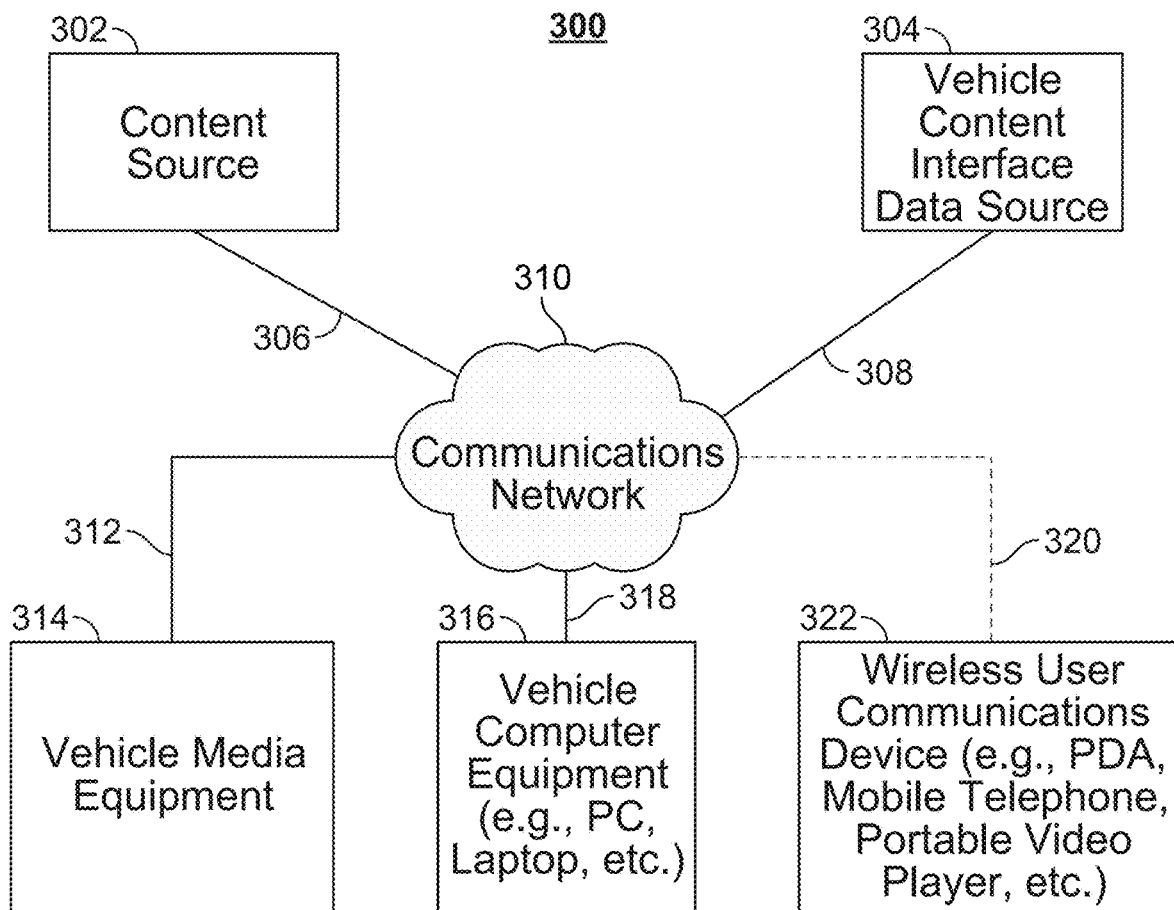
FIG. 3 depicts an example of an illustrative system implementing the user equipment device, in accordance with one embodiment.

User equipment device 200 of FIG. 2 can be implemented in a system 300 of FIG. 3 as vehicle media equipment 314, vehicle computer equipment 316, wireless user communications device 322 or any other type of user equipment suitable for accessing content, such as a non-portable gaming machine. For simplicity, these devices may be referred to herein collectively as user equipment or user equipment devices and may be substantially similar to user equipment devices described above. User equipment devices, on which a vehicle content interface application may be implemented, may function as stand-alone devices or may be part of a network of devices. Various network configurations of devices may be implemented and are discussed in more detail below.

A user equipment device utilizing at least some of the system features described above in connection with FIG. 3 may not be classified solely as vehicle media equipment 314, or vehicle computer equipment 316, or a wireless user communications device 322. For example, vehicle media equipment 314 may, like some vehicle computer equipment 316, be Internet-enabled, allowing for access to Internet content, while wireless user computer equipment 322 may, like some vehicle media equipment 314, include a tuner allowing for access to media programming. The vehicle content interface application may have the same layout on various types of user equipment or may be tailored to the display capabilities of the user equipment. For example, on wireless user computer equipment 316, the vehicle content interface application may be provided as a website accessed by a web browser. In another example, the vehicle content interface application may be scaled down for wireless user communications devices 322.

The user equipment devices may be coupled to communications network 310. Communications network 310 may be one or more networks including the Internet, a mobile phone network, mobile voice or data network (e.g., a 4G, 5G or LTE network), cable network, public switched telephone network, or other types of communications network or combinations of communications networks.

System 300 includes content source 302 and vehicle content interface data source 304 coupled to communications network 310. Communications with the content source 302 and the data source 304 may be exchanged over one or more communications paths but are shown as a single path in FIG. 3 to avoid overcomplicating the drawing. Although communications between data sources 302 and 304 with user equipment devices 314, 316, and 322 are shown as through communications network 310, in some embodiments, data sources 302 and 304 may communicate directly 312 and 320 with user equipment devices 314, 316, and 322.

Content source 302 may include one or more types of content distribution equipment including a media distribution facility, satellite distribution facility, programming sources, intermediate distribution facilities and/or servers, Internet providers, on-demand media servers, and other content providers. Vehicle content interface data source 304 may provide content data, such as the audio described above. Vehicle content interface application data may be provided to the user' equipment devices using any suitable approach. In some embodiments, vehicle content interface data from vehicle content interface data source 304 may be provided to users' equipment using a client/server approach. For example, a user equipment device may pull content data from a server, or a server may present the content data to a user equipment device. Data source 304 may provide user equipment devices 314, 316 and 322 the vehicle content interface application itself or software updates for the vehicle content interface application.

Figure 4:
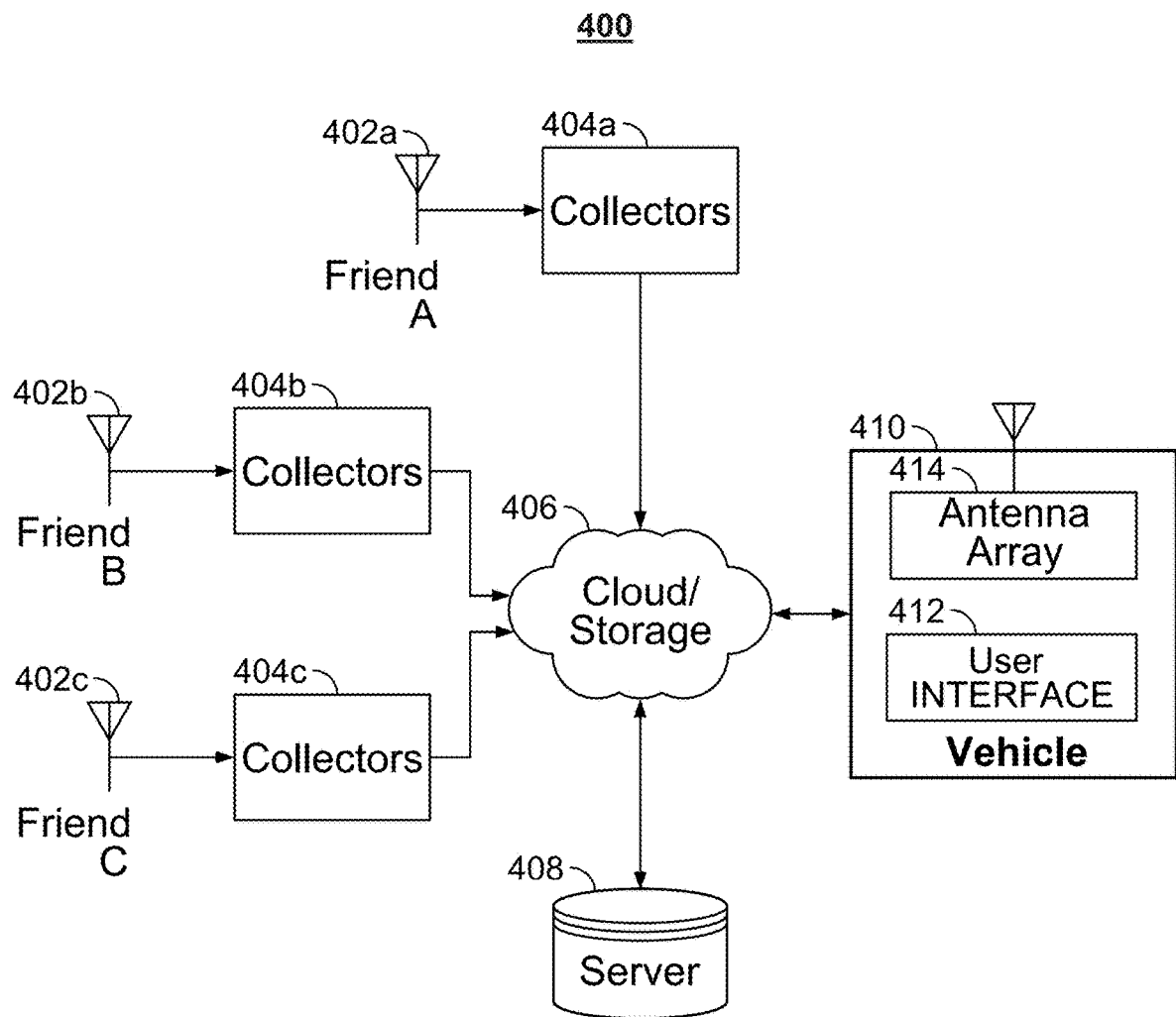
FIG. 4 depicts a block diagram of an illustrative example of a user equipment device, in accordance with one embodiment.

FIG. 4 shows a generalized embodiment of an illustrative system 400 in which user equipment device 200 of FIG. 2 and the system 300 of FIG. 3 can be implemented. System 400 includes an array of vehicle antennas (e.g., 402*a*, 402*b*, 402*c* . . . 402*n*) associated with friends and connected to collectors (e.g., 404*a*, 404*b*, 404*c* . . . 404*n*) coupled to storage device 406, server 408 and a vehicle 410. The vehicle 410 can communicate bidirectionally with other systems outside of the vehicle. Communications with an array of antennas (e.g., 402*a*, 402*b*, 402*c* . . . 402*n*) associated with friends and connected to collectors (e.g., 404*a*, 404*b*, 404*c* . . . 404*n*) and storage device 406 may be exchanged over one or more communications paths but are shown as a single path in FIG. 4 to avoid overcomplicating the drawing. In other examples, groups of friends can be replaced with any number of users or occupants of one or more vehicles that have a connection or relationship with one another, e.g., family members, social media connections etc.

The array of vehicle antennas (e.g., 402*a*, 402*b*, 402*c* . . . 402*n*) associated with friends may include a plurality of antennas coupled to receive and transmit data associated with generating playlists and presenting the playlist. The antennas may be coupled to collectors (e.g., 404*a*, 404*b*, 404*c* . . . 404*n*) that collect all of the data associated with a generated playlist and an initiated party mode and deliver the data to the storage device 406. The storage device 406 are connected to the server 408 for processing for recognition of media content and geographical location determination. Media content is processed through an automated content recognition, the automated content recognition can store, allocate based on content recognition and process for presentation of the media content to a playlist on the user interface of the vehicle. The server 408 may be a collection of servers connected to the storage device for improved processing. The vehicle includes a user interface 412 and a vehicle antenna 414 that communicates with the storage device 406. All of the communication between the antennas, collectors, servers and vehicle may be through one or more networks including the Internet, a mobile phone network, mobile voice or data network (e.g., a 4G, 5G or LTE network), or other types of communications network or combinations of communications networks for in-vehicle use.

Figure 5:
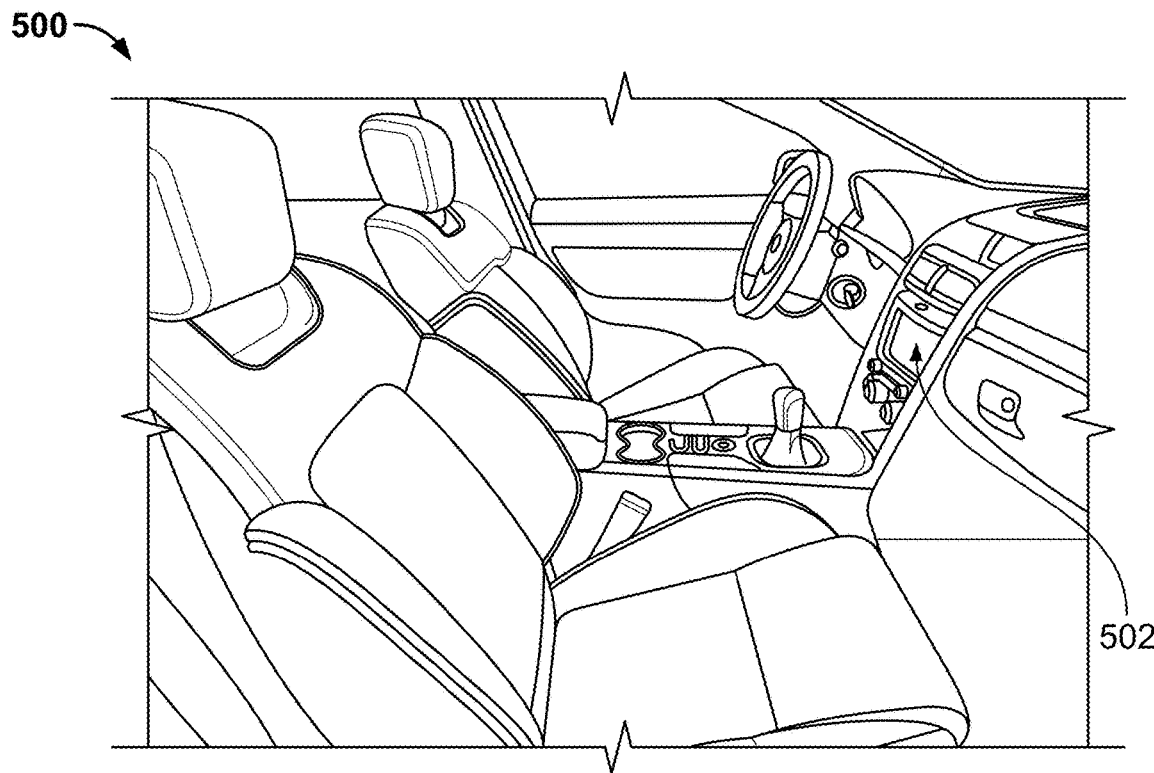
FIG. 5 depicts an illustrative example of a vehicle featuring a content display, in accordance with one embodiment.

In one embodiment, user equipment may refer to components incorporated into, coupled to, or accessible by a vehicle such as vehicle 500 in FIG. 5. The vehicle 500 is equipped with a vehicle content interface application that may be used to enable/disable content options. For example, a user or occupant in vehicle 500 may use vehicle content interface component 502 to access content on the vehicle 500. In some embodiments, the vehicle content interface component 502 may be an audio system incorporated into vehicle 500 or user equipment used to access such content while using vehicle 500.

Figure 6:
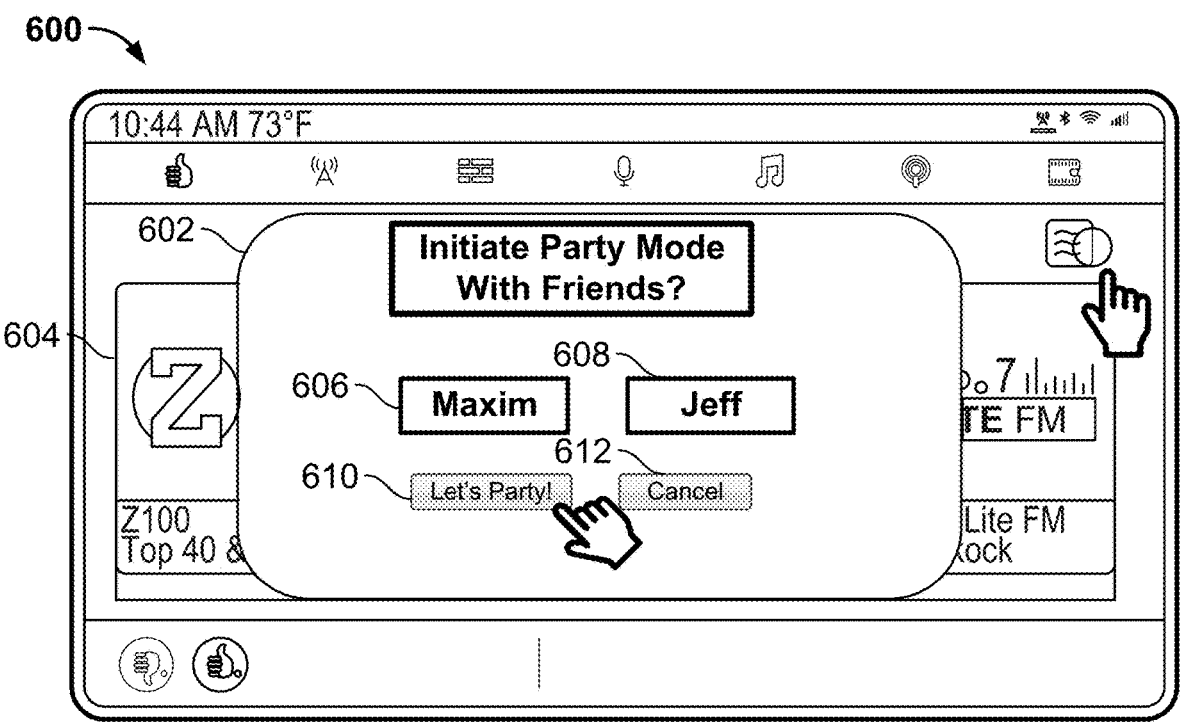
FIG. 6 depicts an illustrative example of a vehicle content interface application for displaying content in a vehicle, in accordance with one embodiment.

As discussed above, in some embodiments, a user or occupant of the vehicle 500 may select the user interface 600 incorporated into or accompanying the vehicle content interface component 502 by direct input into the user interface (e.g., activating the system via user interface 600, FIG. 6). Upon a user's selection of the user interface 600, an audio user interface element 604 is displayed on the user interface 600, as shown in FIG. 6. When the system determines that a first vehicle and a second vehicle are either travelling to the same destination or have departed from the same location, the system presents on the user interface 600, an initiate party mode prompt 602. Said prompt shows that Maxim 604 and Jeff 608 are sharing their playlist and want you to join by selection of the Let's Party tab 610. When the user or occupant of the vehicle selects the ("Let's Party") tab 610, the system transmits the Maxim's playlist for concurrent presentation and enjoyment.

In another embodiment, a Global Positioning System (GPS) can be used for tracking the location of the first vehicle and the second vehicle. The system can identify the location of the first vehicle, the second vehicle, the destination for each of the vehicles and the predicted path of both of the vehicles. In some example, the system can determine that the first vehicle and the second vehicle are at the same location by determining that the geographical location of the first vehicle is within a predefined radius (e.g., 500 feet, 250 feet, etc.) of the geographical location of the second vehicle. Based on determining that the vehicles are at the same geographical location, the system may generate a playlist that is a specific length (e.g., 30 minutes, 15 minutes) to be presented to the first vehicle and the second vehicle.

The system, based on the geographical location of the second vehicle and the destination of the second vehicle, may determine the length of the trip for the second vehicle, and based on the length of the playlist, may transmit the playlist to be presented such that the playlist concludes as the vehicle arrives at the destination of the second vehicle. Accordingly, the user benefits from listening to the entire playlist and does not arrive at the destination at the midpoint of the playlist and may be forced to stopped listening to the playlist without the playlist concluding. For example, a first vehicle and a second vehicle are traveling to the same destination (e.g., New York City) from two different locations (e.g., Philadelphia and Boston). The length of travel for first vehicle and the second vehicle may vary based on the length of the trip. The system may determine that a playlist (e.g., songs selected by user of first vehicle) is 34 minutes long, and for the second vehicle to enjoy the entire playlist, the system may transmit the 34 minute playlist to the second vehicle such that the entire 34 minute playlist will be presented to the second vehicle prior to arriving at the same destination as the first vehicle.

Figure 7:
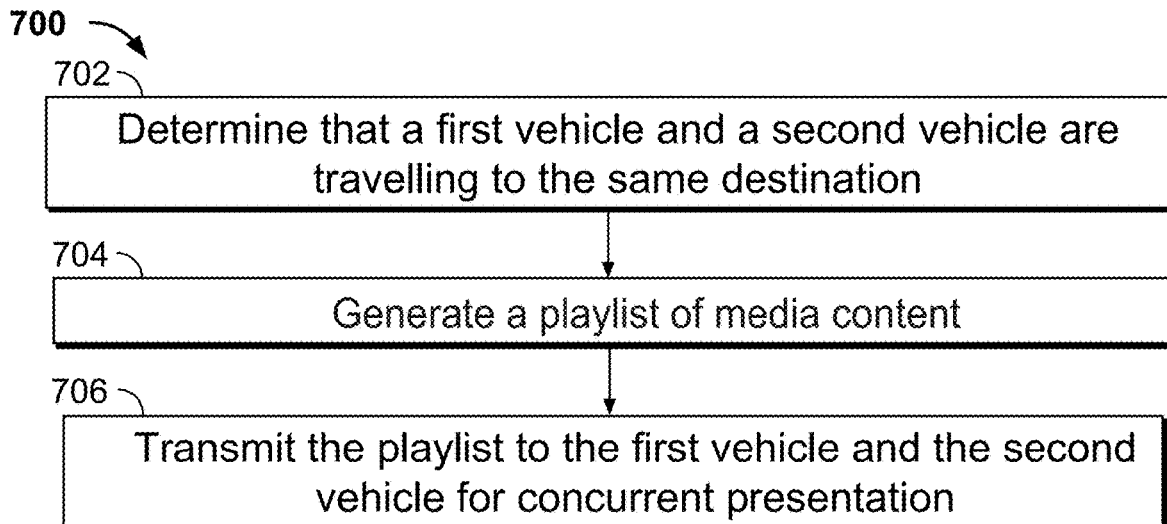
FIG. 7 depicts an example of an illustrative flowchart of a process for generating a playlist based on vehicles traveling to the same location, in accordance with one embodiment.

FIG. 7 depicts a flowchart of an illustrative process 700 for locating a plurality of vehicles, generating a playlist based on vehicles traveling to the same location and transmitting the playlist for concurrent presentation over a network to the plurality of vehicles for in-vehicle use, in accordance with some embodiments of the disclosure. It should be noted that process 700 or any step thereof could be performed on, or provided by, the system of FIGS. 3 and 4 or any of the devices shown in FIGS. 1, 5 and 6. In addition, one or more of processes 700 may be incorporated into or combined with one or more other steps described herein (e.g., incorporated into steps of processes 800, 900, 1000, 1100 and 1200. For example, process 700 may be executed by control circuitry 212 of FIG. 2, as instructed by a vehicle content interface application implemented on a user device in order to provide concurrent content presentation. In addition, one or more steps of process 700 may be incorporated into or combined with one or more steps of any other process or embodiment. At 702, the control circuitry determines that a first vehicle and a second vehicle are travelling to the same destination. For example, the system may receive from a user input (e.g., via user interface 600 (FIG. 6)) selecting a criterion for a destination and predicted path.

At 704, control circuitry may generate a playlist of media content. For example, the system based on user profiles and preferences, may generate a playlist for presentation in the first vehicle. At 706, control circuitry may transmit the same playlist of media content to the second vehicle over a network via the antennas.

Figure 8:
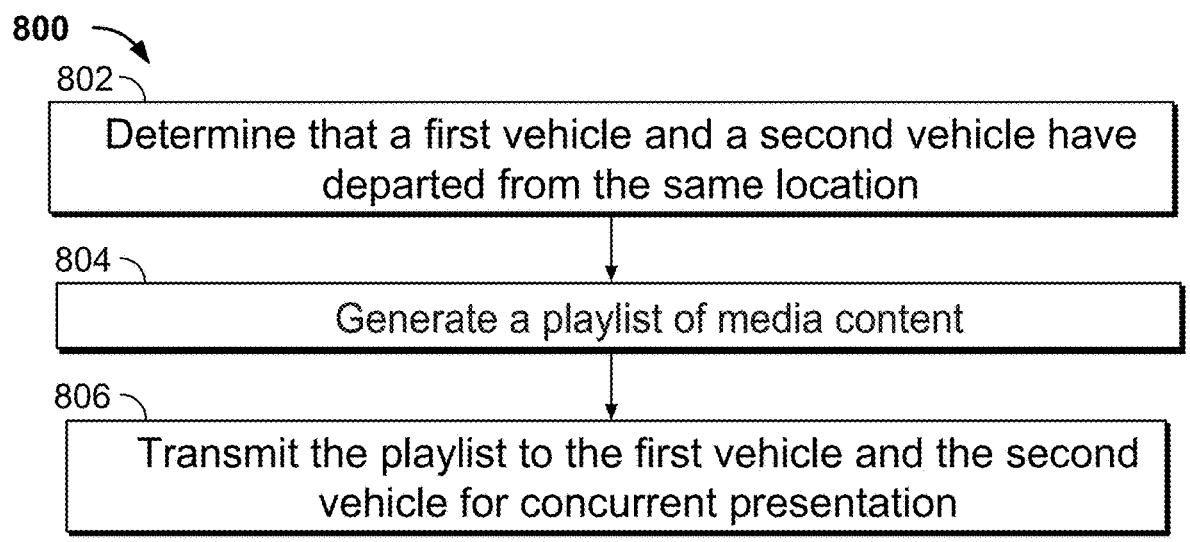
FIG. 8 depicts an example of an illustrative flowchart of a process for generating a playlist based on vehicles departing from the same location, in accordance with one embodiment.

FIG. 8 depicts a flowchart of an illustrative process 800 for locating a plurality of vehicles, generating a playlist based on vehicles departing from the same location and transmitting the playlist for concurrent presentation over a network to the plurality of vehicles for in-vehicle use, in accordance with some embodiments of the disclosure. It should be noted that processes 800 or any step thereof could be performed on, or provided by, the system of FIGS. 3 and 4 or any of the devices shown in FIGS. 1, 5 and 6. In addition, one or more of processes 800 may be incorporated into or combined with one or more other steps described herein (e.g., incorporated into steps of processes 700, 900, 1000, 1100 and 1200. For example, process 800 may be executed by control circuitry 212 (FIG. 2) as instructed by a vehicle content interface application implemented on a user device in order to provide to concurrent content presentation. In addition, one or more steps of process 800 may be incorporated into or combined with one or more steps of any other process or embodiment. At 802, the control circuitry determines that a first vehicle and a second vehicle have departed from the same location. For example, the system may receive from a user input (e.g., via user interface 600 (FIG. 6)) selecting a criterion for a destination and predicted path.

At 804, control circuitry may generate a playlist of media content. For example, the system based on user profiles and preferences, may generate a playlist for presentation in the first vehicle. At 806, control circuitry may transmit the same playlist of media content to the second vehicle over a network via the antennas.

Figure 9:
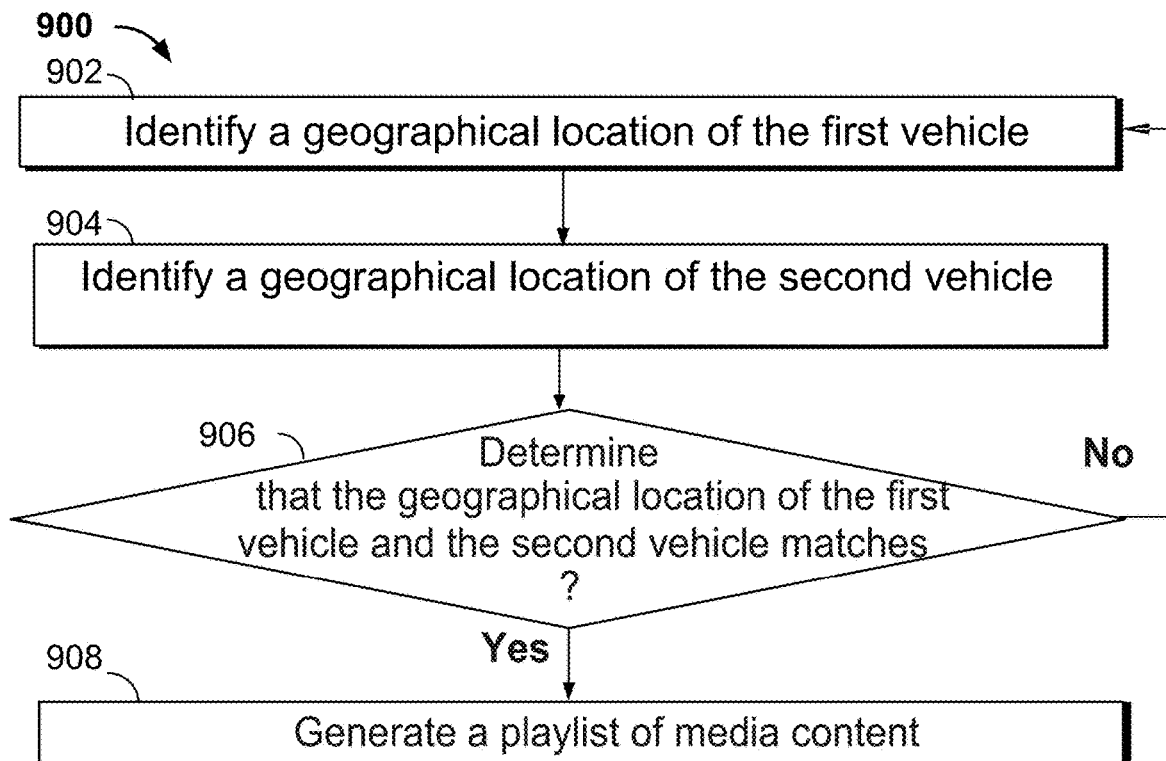
FIG. 9 depicts an example of an illustrative flowchart of a process for determining the geographical location of the first vehicle and the second vehicle, in accordance with one embodiment.

FIG. 9 depicts an example of an illustrative flowchart for determining the geographical location of the first vehicle and the second vehicle, in accordance with one embodiment. It should be noted that processes 900 or any step thereof could be performed on, or provided by, the system of FIGS. 3 and 4. In addition, one or more of processes 900 may be incorporated into or combined with one or more other steps described herein (e.g., incorporated into steps of processes 700, 800, 1000, 1100 and 1200. For example, process 900 may be executed by control circuitry 212 (FIG. 2) as instructed by a vehicle content interface application implemented on a user device in order to provide concurrent content presentation. In addition, one or more steps of process 900 may be incorporated into or combined with one or more steps of any other process or embodiment.

Process 900 begins at 902, where the processing circuitry may identify a geographical location of the first vehicle. For example, the processing circuitry may monitor the location of the first vehicle. At 904, where the processing circuitry may proceed depends on the outcome of step 902, the processing circuitry may identify a geographical location of the second vehicle. For example, the processing circuitry may monitor the location of the second vehicle. At 906, the processing circuitry may determine based on the geographical location of each of the vehicles if the vehicles are departing same location or if they are traveling to the same location. Otherwise, process 900 may return to step 902 and continue to identify a geographical location of the first vehicle.

Figure 10:
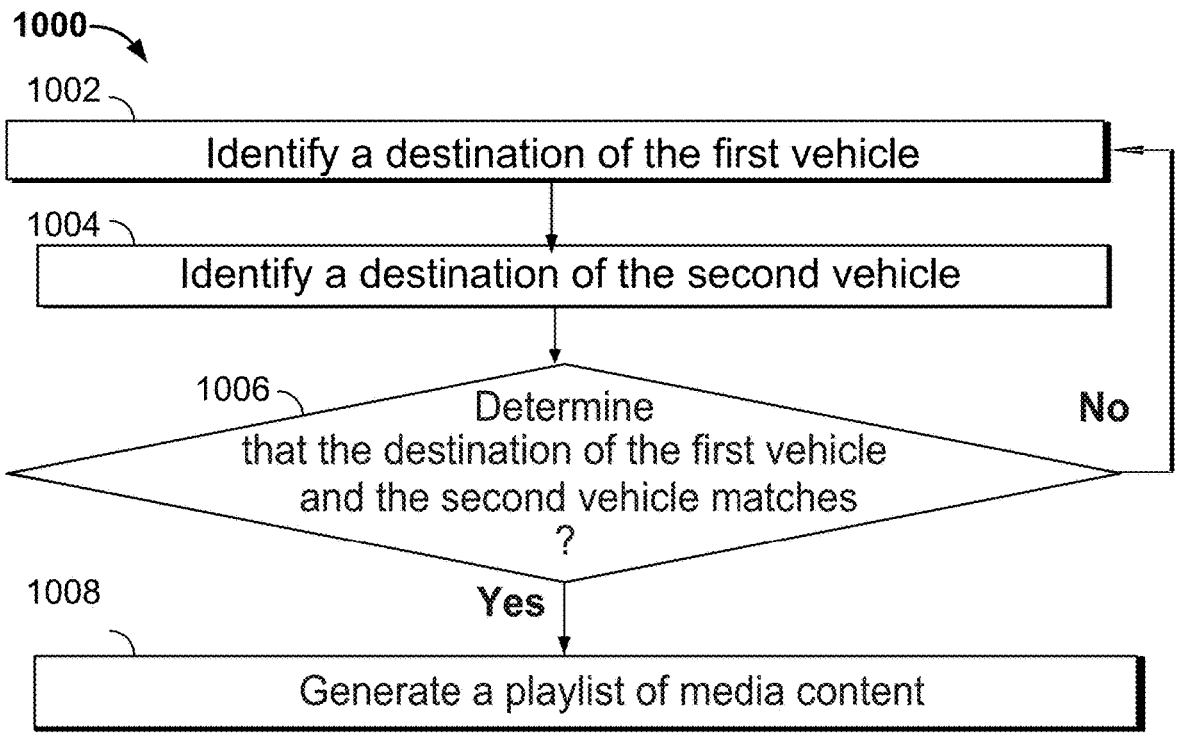
FIG. 10 depicts an example of an illustrative flowchart of a process for determining the destination of the first vehicle and the second vehicle, in accordance with one embodiment.

FIG. 10 depicts an example of an illustrative flowchart for determining the destination of the first vehicle and the second vehicle, in accordance with one embodiment. It should be noted that processes 1000 or any step thereof could be performed on, or provided by, the system of FIGS. 3 and 4. In addition, one or more of processes 1000 may be incorporated into or combined with one or more other steps described herein (e.g., incorporated into steps of processes 700, 800, 900, 1100 and 1200. For example, process 1000 may be executed by control circuitry 212 (FIG. 2) as instructed by a vehicle content interface application implemented on a user device in order to provide concurrent content presentation. In addition, one or more steps of process 1000 may be incorporated into or combined with one or more steps of any other process or embodiment.

Process 1000 begins at 1002, where the processing circuitry may identify a destination of the first vehicle. For example, the processing circuitry may monitor the location of the first vehicle. At 1004, where the processing circuitry may proceed depends on the outcome of step 1002, the processing circuitry may identify a destination of the second vehicle. For example, the processing circuitry may monitor the location of the second vehicle. At 1006, the processing circuitry may determine based on the destination of each of the vehicles if the vehicles are departing same location or if they are traveling to the same location. Otherwise, process 1000 may return to step 1002 and continue to identify a destination of the first vehicle.

Figure 11:
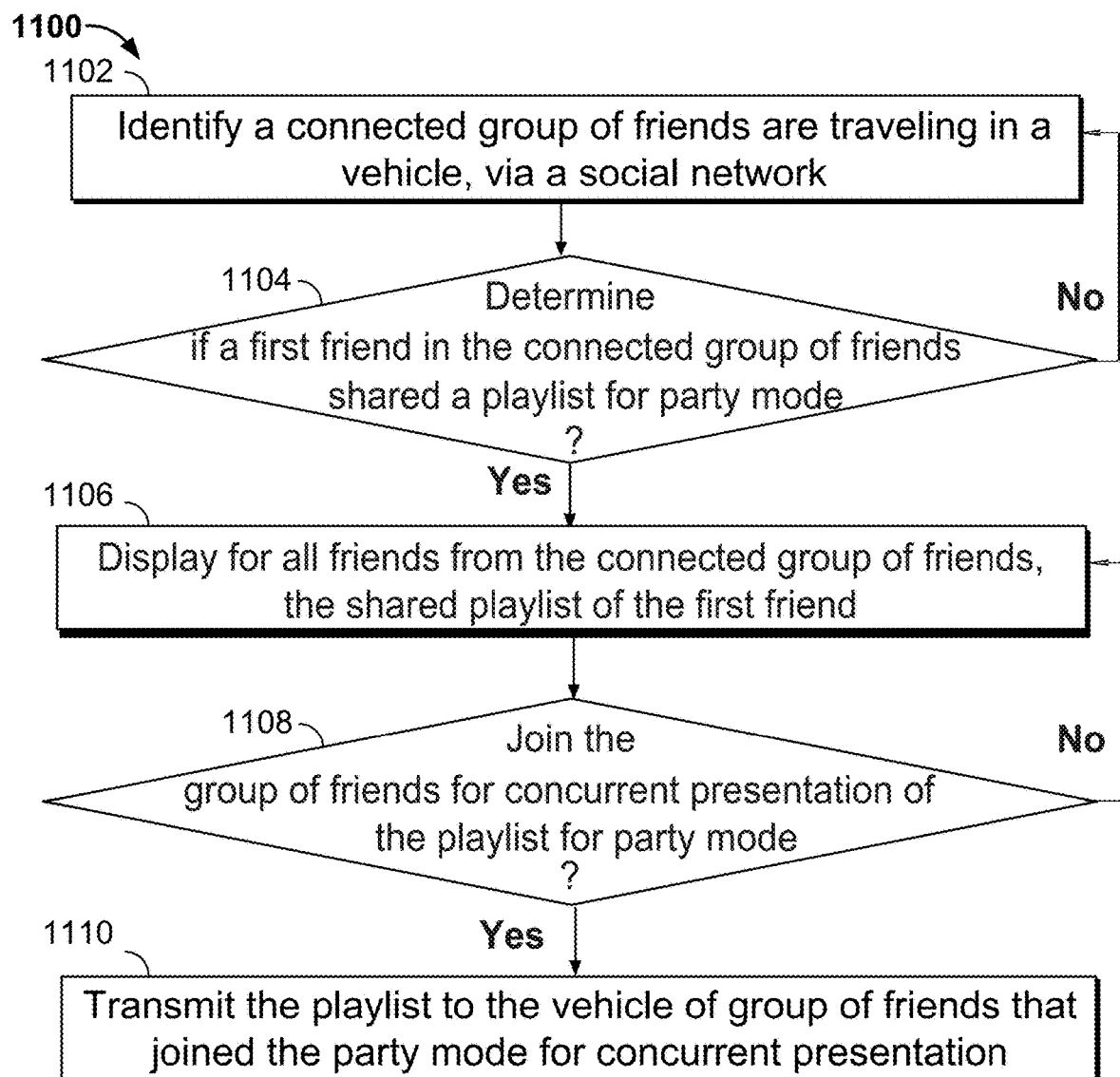
FIG. 11 depicts an example of an illustrative flowchart of a process for transmitting a playlist to a connected group of friends for concurrent presentation, in accordance with one embodiment.

FIG. 11 depicts an example of an illustrative flowchart of the process for transmitting a playlist to a connected group of friends for concurrent presentation, in accordance with one embodiment. It should be noted that processes 1100 or any step thereof could be performed on, or provided by, the system of FIGS. 3 and 4. In other examples, groups of friends can be replaced with any number of users or occupants of one or more vehicles that have a connection or relationship with one another, e.g., family members, social media connections etc. In addition, one or more of processes 1100 may be incorporated into or combined with one or more other steps described herein (e.g., incorporated into steps of processes 700, 800, 900, 1000 and 1200. For example, process 1100 may be executed by control circuitry 212 (FIG. 2) as instructed by a vehicle content interface application implemented on a user device in order to provide concurrent content presentation. In addition, one or more steps of process 1100 may be incorporated into or combined with one or more steps of any other process or embodiment.

Process 1100 begins at 1102, where the processing circuitry may identify a connected group of friends are traveling in a vehicle, via a social network. For example, the connected group of friends may be connected via Internet based application, a social network, (e.g., Facebook®, Snapchat®, Instagram®, Twitter®, etc.). At 1104, where the processing circuitry may proceed depends on the outcome of step 1102, the processing circuitry may determine if a first friend of the connected group of friends shared a playlist for party mode. If the control circuitry determines that the first friend of the connected group of friends shared a playlist ("Yes" at 1104), then at 1106, control circuitry displays for all friends from the connected group of friends, the shared playlist of the first friend. For example, the processing circuitry may monitor if one of the friends of the group of friends shared a playlist and when one or more of the friends from the connected group of friends shares a playlist the processing circuitry displays the playlist for all connected friends to listen and enjoy. If, on the other hand, control circuitry does not determine that a first friend of the connected group of friends shared a playlist ("No" at 1104), then the process 1102 is repeated. At 1108, where the processing circuitry may proceed depends on the outcome of step 1106, the processing circuitry may prompt a request to join the group of friends for concurrent presentation of the playlist. If a friend from the connected group of friends joins the concurrent presentation ("Yes" at 1108), then at 1110, control circuitry transmits the playlist to the vehicle of group of friends that joined the party mode for concurrent presentation. If, on the other hand, the friend from the connected group of friends does not join the concurrent presentation ("No" at 1110), then the process 1106 is repeated.

Figure 12:
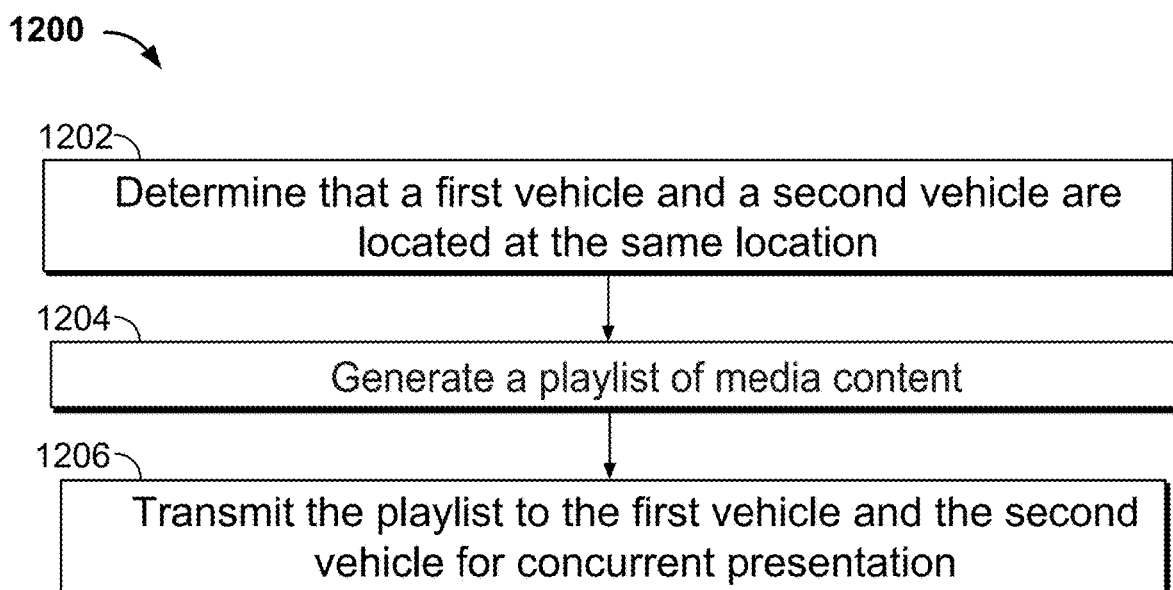
FIG. 12 depicts an example of an illustrative flowchart of a process for generating a playlist based on vehicles remaining stationary at the same location, in accordance with one embodiment.

FIG. 12 depicts a flowchart of an illustrative process 1200 for generating a playlist based on vehicles remaining stationary at the same location, in accordance with some embodiments of the disclosure. It should be noted that process 1200 or any step thereof could be performed on, or provided by, the system of FIGS. 3 and 4 or any of the devices shown in FIGS. 1, 5 and 6. In addition, one or more of processes 1200 may be incorporated into or combined with one or more other steps described herein (e.g., incorporated into steps of processes 700, 800, 900, 1000 and 1100. For example, process 1200 may be executed by control circuitry 212 of FIG. 2, as instructed by a vehicle content interface application implemented on a user device in order to provide concurrent content presentation. In addition, one or more steps of process 1200 may be incorporated into or combined with one or more steps of any other process or embodiment. At 1202, the control circuitry determines that a first vehicle and a second vehicle are located at the same destination. The system may determine, based on a geographical location of a number of vehicle, that a number of vehicles are in the same geographical location and at the same time, for example, vehicles parked at a Sunday morning place of worship, or a school parking lot, or a stadium parking lot during a sporting event (e.g., NFL football game). In response to determining that the vehicles are at the same geographical location, transmitting a playlist to the vehicles for concurrent presentation. Accordingly, the users or occupants of the first vehicle and the second vehicle may practice social distancing while also enhancing and improving the listening experience for both the first vehicle and the second vehicle.

At 1204, control circuitry may generate a playlist of media content. For example, the system based on user profiles and preferences, may generate a playlist for presentation in the first vehicle. At 1206, control circuitry may transmit the same playlist of media content to the second vehicle over a network via the antennas for concurrent presentation of the playlist.

The systems and processes discussed above are intended to be illustrative and not limiting. One skilled in the art would appreciate that the actions of the processes discussed herein may be omitted, modified, combined, and/or rearranged, and any additional actions may be performed without departing from the scope of the invention. More generally, the above disclosure is meant to be exemplary and not limiting. Only the claims that follow are meant to set bounds as to what the present disclosure includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method for concurrent content presentation, the method comprising:
    identifying a geographical location of a first vehicle;
    identifying a geographical location of a second vehicle;
    identifying a connection between a first user of the first vehicle and a second user of the second vehicle;
    in response to identifying that the geographical location of the first vehicle matches the geographical location of the second vehicle, determining that the geographical location of the first vehicle and the geographical location of the second vehicle are a same geographical location;
    in response to determining that the geographical location of the first vehicle and the geographical location of the second vehicle are the same geographical location, determining that the first vehicle and the second vehicle have departed from the same geographical location; and
    in response to the determining that the first vehicle and the second vehicle have departed from the same geographical location and that one of the first user of the first vehicle or the second user of the second vehicle have made a selection to provide media content in the first vehicle and the second vehicle:
    generating a playlist of the media content, wherein:
        the media content is selected based on a combination of content type and geographical origin,
        the playlist comprises one or more selections of the media content, and
        a length of the playlist is determined based on at least a span of a trip of the first vehicle and a span of a trip of the second vehicle; and
    transmitting the playlist to the first vehicle and the second vehicle for concurrent presentation, wherein the concurrent presentation of the playlist comprises generating, in the first vehicle and the second vehicle at the same time, a same media content from the playlist of the media content.

2. The method of claim 1, wherein the first user of the first vehicle and the second user of the second vehicle are connected via a social network.

3. The method of claim 1, wherein transmitting the playlist over a network, the network is one of a 3G network, a 4G network, an LTE network, an LTE-Advanced (LTE-A) network, a Global System for Mobile Communications (GSM) network, a Code Division Multiple Access (CDMA) network, a Wideband Code Division Multiple Access (WCDMA) network, an Ultra Mobile Broadband (UMB) network, a High-Speed Packet Access (HSPA) network, an Evolution Data Optimized (EV-DO) network, or a Universal Mobile Telecommunications System (UMTS) network.

4. The method of claim 1, further comprising determining that the first vehicle and the second vehicle are travelling to a same destination by:
    identifying a destination of the first vehicle;
    identifying a destination of the second vehicle; and
    in response to identifying the destination of the first vehicle and the destination of the second vehicle, determine that the destination of the first vehicle matches the destination of the second vehicle.

5. The method of claim 1, wherein the same geographical location is a predefined radius from the geographical location of the first vehicle.

6. The method of claim 1, further comprising:
    determining the length of the playlist;
    identifying the span of the trip of the first vehicle and the span of the trip of the second vehicle; and
    in response to determining the length of the playlist, the span of the trip of the first vehicle and the span of the trip of the second vehicle, transmitting the playlist to the first vehicle to conclude at an end of the span of the trip of the first vehicle and transmit the playlist to the second vehicle to conclude at an end of the span of the trip of the second vehicle.

7. The method of claim 1, further comprising:
    in response to determining that the first vehicle and the second vehicle have departed from the same geographical location, determining a time to destination of the first vehicle and a time to destination of the second vehicle;
    determining the length of the playlist; and
    in response to determining the length of the playlist, the time to destination of the first vehicle and the time to destination of the second vehicle, transmitting the playlist to the first vehicle to conclude presentation before arriving at the destination of the first vehicle and transmitting the playlist to the second vehicle to conclude presentation before arriving at the destination of the second vehicle.

8. The method of claim 1, further comprising:
    in response to determining that the first vehicle and the second vehicle are travelling to a same destination, transmit the playlist for presentation to conclude upon arrival at the same destination.

9. The method of claim 1, wherein generating the playlist of the media content comprises:
    receiving a selection provided by the first user in the first vehicle;
    generating the playlist based on the selection of the first user in the first vehicle.

10. The method of claim 1, wherein generating the playlist of the media content comprises:

generating the playlist based on a selection of the first user in the first vehicle, in response to generating the playlist, presenting on an interface in the second vehicle an offer to listen to the generated playlist from the first vehicle; and in response to receiving acceptance of the offer via the interface in the second vehicle, transmitting the generated playlist via a network to the second vehicle.

11. A system for concurrent content presentation, the system comprising:

control circuitry configured to:

identify a geographical location of a first vehicle;

identify a geographical location of a second vehicle;

identify a connection between a first user of the first vehicle and a second user of the second vehicle;

in response to identifying that the geographical location of the first vehicle matches the geographical location of the second vehicle, determine that the geographical location of the first vehicle and the geographical location of the second vehicle are a same geographical location;

in response to determining that the geographical location of the first vehicle and the geographical location of the second vehicle are the same geographical location, determine that the first vehicle and the second vehicle have departed from the same geographical location; and in response to the determining that the first vehicle and the second vehicle have departed from the same geographical location and that one of the first user of the first vehicle or the second user of the second vehicle have made a selection to provide media content in the first vehicle and the second vehicle:

generate a playlist of the media content, wherein:

the media content is selected based on a combination of content type and geographical origin, the playlist comprises one or more selections of the media content, and a length of the playlist is determined based on at least a span of a trip of the first vehicle and a span of a trip of the second vehicle; and transmit the playlist to the first vehicle and the second vehicle for concurrent presentation, wherein the concurrent presentation of the playlist comprises generating, in the first vehicle and the second vehicle at the same time, a same media content from the playlist of the media content.

12. The system of claim 11, wherein the first user of the first vehicle and the second user of the second vehicle are connected via a social network.

13. The system of claim 11, wherein the control circuitry configured to transmit the playlist over a network, the network is one of a 3G network, a 4G network, an LTE network, an LTE-Advanced (LTE-A) network, a Global System for Mobile Communications (GSM) network, a Code Division Multiple Access (CDMA) network, a Wideband Code Division Multiple Access (WCDMA) network, an Ultra Mobile Broadband (UMB) network, a High-Speed Packet Access (HSPA) network, an Evolution Data Optimized (EV-DO) network, or a Universal Mobile Telecommunications System (UMTS) network.

14. The system of claim 11, wherein the control circuitry is further configured to determine that the first vehicle and the second vehicle are travelling to a same destination by:

identifying a destination of the first vehicle;

identifying a destination of the second vehicle; and in response to identifying the destination of the first vehicle and the destination of the second vehicle, determining that the destination of the first vehicle matches the destination of the second vehicle.

15. The system of claim 11, wherein the same geographical location is a predefined radius from the geographical location of the first vehicle.

16. The system of claim 11, wherein the control circuitry is further configured to:

determine the length of the playlist;

identify the span of the trip of the first vehicle and the span of the trip of the second vehicle; and in response to determining the length of the playlist, the span of the trip of the first vehicle and the span of the trip of the second vehicle, transmit the playlist to the first vehicle to conclude at an end of the span of the trip of the first vehicle and transmit the playlist to the second vehicle to conclude at an end of the span of the trip of the second vehicle.

17. The system of claim 11, wherein the control circuitry is further configured to:

in response to determining that the first vehicle and the second vehicle have departed from the same geographical location, determine a time to destination of the first vehicle and a time to destination of the second vehicle;

determine the length of the playlist; and in response to determining the length of the playlist, the time to destination of the first vehicle and the time to destination of the second vehicle, transmit the playlist to the first vehicle to conclude presentation before arriving at the destination of the first vehicle and transmit the playlist to the second vehicle to conclude presentation before arriving at the destination of the second vehicle.

18. The system of claim 11, wherein the control circuitry is further configured to:

in response to determining that the first vehicle and the second vehicle are travelling to a same destination, transmit the playlist for presentation to conclude upon arrival at the same destination.

19. The system of claim 11, wherein the control circuitry is configured to generate the playlist of the media content comprises:

receiving a selection provided by the first user in the first vehicle;

generating the playlist based on the selection of the first user in the first vehicle.

20. The system of claim 11, wherein the control circuitry is configured to generate the playlist of the media content comprises:

generating the playlist based on a selection of the first user in the first vehicle, in response to generating the playlist, presenting on an interface in the second vehicle an offer to listen to the generated playlist from the first vehicle; and in response to receiving acceptance of the offer via the interface in the second vehicle, transmitting the generated playlist via a network to the second vehicle.

* * * * *